(12) United States Patent
Numajiri

(10) Patent No.: US 8,631,576 B2
(45) Date of Patent: Jan. 21, 2014

(54) METHOD FOR ATTACHING ROTOR OF WIND TURBINE GENERATOR AND METHOD FOR CONSTRUCTING WIND TURBINE GENERATOR

(75) Inventor: Tomohiro Numajiri, Nagasaki (JP)

(73) Assignee: Mitsubishi Heavy Industries, Ltd, Tokyo (JP)

( * ) Notice: Subject to any disclaimer, the term of this patent is extended or adjusted under 35 U.S.C. 154(b) by 47 days.

(21) Appl. No.: 12/445,351

(22) PCT Filed: Apr. 25, 2008

(86) PCT No.: PCT/JP2008/058021
§ 371 (c)(1),
(2), (4) Date: Apr. 13, 2009

(87) PCT Pub. No.: WO2008/146560
PCT Pub. Date: Dec. 4, 2008

(65) Prior Publication Data
US 2010/0043227 A1    Feb. 25, 2010

(30) Foreign Application Priority Data
May 25, 2007    (JP) .................................. 2007-139432

(51) Int. Cl.
*B21K 25/00*    (2006.01)
(52) U.S. Cl.
USPC ........................... 29/889.21; 29/889; 212/270
(58) Field of Classification Search
USPC ............. 29/889, 889.1, 428, 889.21; 415/4.3, 415/4.5; 416/244 R, 1; 290/44, 45, 55; 212/175, 176, 179, 196, 270, 271, 274
See application file for complete search history.

(56) References Cited

U.S. PATENT DOCUMENTS 3,653,518 A * 4/1972 Polen .............................. 212/330
6,644,486 B2 * 11/2003 Jacoff et al. .................... 212/274
(Continued)

FOREIGN PATENT DOCUMENTS

JP    08-218641 A1    8/1996
JP    2002-147340 A    5/2002
(Continued)

OTHER PUBLICATIONS

ISR for PCT/JP2008/058021 mailed Aug. 5, 2008.
(Continued)

*Primary Examiner* — David Bryant
*Assistant Examiner* — Ryan J Walters
(74) *Attorney, Agent, or Firm* — Kanesaka Berner & Partners, LLP

(57) ABSTRACT

A method for attaching a rotor of a wind turbine generator and a method for constructing a wind turbine generator are provided, with which the rotor blades can be prevented from breaking and with which the construction costs can be reduced. The present invention includes: an assembly step (S1) in which a plurality of wind-turbine rotor blades are attached to a rotor head to assemble the rotor on the ground; a wire attaching step (S2) in which a first wire is attached to a first hoisting portion provided on a rotation axis of the rotor and in which a second wire is attached to a second hoisting portion provided at a position away from the rotation axis; a hoisting step (S3) in which the rotor is hoisted with the first wire; a rotor raising step (S4) in which the first wire is extended so that the rotor is hoisted with the second wire; and a rotor attaching step (S6) in which the rotor hoisted with the second wire is attached to the nacelle.

13 Claims, 8 Drawing Sheets

(56) References Cited

U.S. PATENT DOCUMENTS

| | | | |
|---|---|---|---|
| 7,708,523 B2* | 5/2010 | Sakaue | 416/1 |
| 2003/0183594 A1 | 10/2003 | Torres Martinez | |
| 2005/0019166 A1 | 1/2005 | Bervang | |
| 2006/0151767 A1 | 7/2006 | Wobben | |
| 2009/0020361 A1* | 1/2009 | Teichert | 182/36 |

FOREIGN PATENT DOCUMENTS

| | | |
|---|---|---|
| JP | 2005-527739 A | 9/2005 |
| JP | 2005531709 A | 10/2005 |
| JP | 2005-320919 A | 11/2005 |
| JP | 2006-118245 A | 5/2006 |
| WO | 03/100249 A1 | 12/2003 |
| WO | 03/102409 A1 | 12/2003 |

OTHER PUBLICATIONS

Australian Office Action for AU Application 2008256047, mailed Jun. 28, 2011.

Decision to Grant issued on Dec. 5, 2012 in corresponding Chinese Patent Application No. 200880000948.X (English Language and Chinese Language).

* cited by examiner

METHOD FOR ATTACHING ROTOR OF WIND TURBINE GENERATOR AND METHOD FOR CONSTRUCTING WIND TURBINE GENERATOR

RELATED APPLICATIONS

The present application is based on International Application Number PCT/JP2008/058021 filed Apr. 25, 2008, and claims priority from Japanese Application Number 2007-139432 filed May 25, 2007, the disclosures of which are hereby incorporated by reference herein in their entirety.

TECHNICAL FIELD

The present invention relates to a method for attaching a rotor of a wind turbine generator and to a method for constructing a wind turbine generator.

BACKGROUND ART

In general, when a rotor is attached to a nacelle of a wind turbine generator, a plurality of, for example, three, rotor blades are attached to the rotor head on the ground to complete the rotor. Then, the horizontally disposed rotor is hoisted by a heavy machine and the like and attached to the nacelle on the top of the tower.

When the rotor blades are attached to the rotor head on the ground, the rotor is disposed such that the plane of rotation is substantially horizontal. On the other hand, when the rotor is attached to the nacelle, the rotor is raised such that the plane of rotation is substantially perpendicular (vertical).

Conventionally, a single large heavy machine holds the rotor head at a position offset from the center of gravity of the rotor, and a single small heavy machine holds the tip of one of the rotor blades.

First, the large heavy machine and the small heavy machine cooperatively hoist the rotor, which maintains an orientation in which the plane of rotation remains substantially horizontal, from the ground into the upward. When the rotor is hoisted to a position where the rotor blade does not interfere with the ground even if the rotor is vertically raised, the small heavy machine stops hoisting and the large heavy machine continues hoisting. Because the large heavy machine holds the rotor head at a position offset from the center of gravity of the rotor, the rotor is vertically raised because of its weight.

Besides the above-described method, a method in which the rotor head is attached to the nacelle first, and the rotor blades are hoisted and sequentially attached to the rotor head has been proposed (for example, Patent Document 1).

This method provides an advantage in that a place for assembling the rotor does not need to be secured on the ground. The above-mentioned advantage is significant especially when constructing a wind turbine generating unit in a place like a mountainous area, where securing flat land is difficult.

Patent Document 1: Japanese Translation of PCT International Application, Publication No. 2005-531709

DISCLOSURE OF INVENTION

However, the above-described method for attaching a rotor using a large heavy machine and a small heavy machine has a problem in that it requires a large heavy machine and a small heavy machine, increasing the construction costs of a wind turbine generating unit.

That is, there are problems in that, besides the reason that a small heavy machine has to be used in addition to a large heavy machine, protecting the places where the large heavy machine and the small heavy machine are to be placed extends the construction period and increases the construction costs.

Furthermore, to improve the aerodynamic performance, the rear edge of each rotor blade is formed in an edge shape. Holding the tip of the rotor blade with the small heavy machine causes excessive stress to act on the rear edge of the rotor blade, leading to a problem in that the rotor blade may be broken.

To prevent the rotor blade from breaking, a method in which the tip of the rotor blade is held via a protector has been proposed. The protector is removed from the rotor blade after the rotor is vertically raised. Because the rotor is hoisted in the upward, a vehicle for high hoisting work is required during removal, resulting in the problem of increased construction costs.

In the method disclosed in Patent Document 1, because the rotor blades are hoisted one by one to be attached to the rotor head, the number of necessary heavy machines can be minimized. However, because the blades disposed horizontally on the ground are vertically raised while being hoisted, the rotor blades are subjected to a load and may be broken.

The present invention has been made to solve the above-described problems, and an object thereof is to provide a method for attaching a rotor of a wind turbine generator and a method for constructing a wind turbine generator with which rotor blades can be prevented from breaking and with which the construction costs can be reduced.

To achieve the above-described object, the present invention provides the following solutions.

A first aspect of the present invention provides a method for attaching a rotor of a wind turbine generator including: an assembly step in which a plurality of wind-turbine rotor blades are attached to a rotor head to assemble the rotor on the ground; a wire attaching step in which a first wire is attached to a first hoisting portion provided on a rotation axis of the rotor and in which a second wire is attached to a second hoisting portion provided at a position away from the rotation axis; a hoisting step in which the rotor is hoisted with the first wire; a rotor raising step in which the first wire is extended so that the rotor is hoisted with the second wire; and a rotor attaching step in which the rotor hoisted with the second wire is attached to the nacelle.

According to the first aspect of the present invention, the rotor is hoisted by a single heavy machine by hoisting the rotor with the first wire attached to the first attaching portion provided on the rotation axis of the rotor. At this time, the rotor is, as it was on the ground, in an orientation in which the plane of rotation of the rotor is substantially horizontal, i.e., the orientation in which the rotation axis is substantially perpendicular. Therefore, the wind-turbine rotor blades are prevented from interfering with the ground.

Then, by extending the first wire while hoisting with a single heavy machine, the rotor is hoisted with the second wire attached to the second attaching portion. Because the second attaching portion is provided at a position away from the rotation axis, the rotor is brought into a vertically raised orientation, i.e., an orientation in which the rotation axis is substantially horizontal.

In other words, the rotor can be hoisted and the orientation of the rotor can be vertically raised without holding the wind-turbine rotor blade. Furthermore, the rotor can be assembled on the ground is hoisted, vertically raised, and then attached to the nacelle by the single heavy machine.

It is preferable that the above-described invention further include, before the rotor attaching step, an orientation adjusting step in which the orientation of the rotor is adjusted by adjusting the length of the first wire.

This enables the inclination of the rotation axis of the rotor to be adjusted by adjusting the length of the first wire. Thus, the inclination of the rotation axis can be adjusted so as to conform to the inclination of the mounting shaft of the nacelle, making the attaching operation of the rotor easy.

In the above-described invention, it is preferable that the first wire have a wire-length adjusting portion for adjusting the length of the first wire.

This enables the orientation of the rotor to be easily adjusted by adjusting the length of the first wire with the wire adjusting portion.

Examples of the wire adjusting portion include a winder for winding up and letting out the wire and a jack device having a feeding mechanism.

A second aspect of the present invention is a method for constructing a wind turbine generator in which a rotor is attached to a nacelle using the method for attaching a rotor of a wind turbine generator of the above-described present invention.

According to the second aspect of the present invention, because the method for attaching a rotor according to the first aspect of the present invention is used, the wind-turbine rotor blade can be prevented from breaking and the construction costs of the wind turbine generator can be reduced.

With the method for attaching a rotor of a wind turbine generator according to the first aspect of the present invention and the method for constructing a wind turbine generator according to the second aspect, after the rotor is hoisted with the first wire by a single heavy machine in such an orientation that the rotation axis is substantially perpendicular, the first wire is extended so that the rotor is hoisted with the second wire, whereby the rotor is vertically raised. Thus, advantages are afforded in that the rotor blade is prevented from breaking because the wind-turbine rotor blade is not held and in that the construction costs can be reduced because the number of heavy machines to be used is only one.

EXPLANATION OF REFERENCE SIGNS

Figure 1:
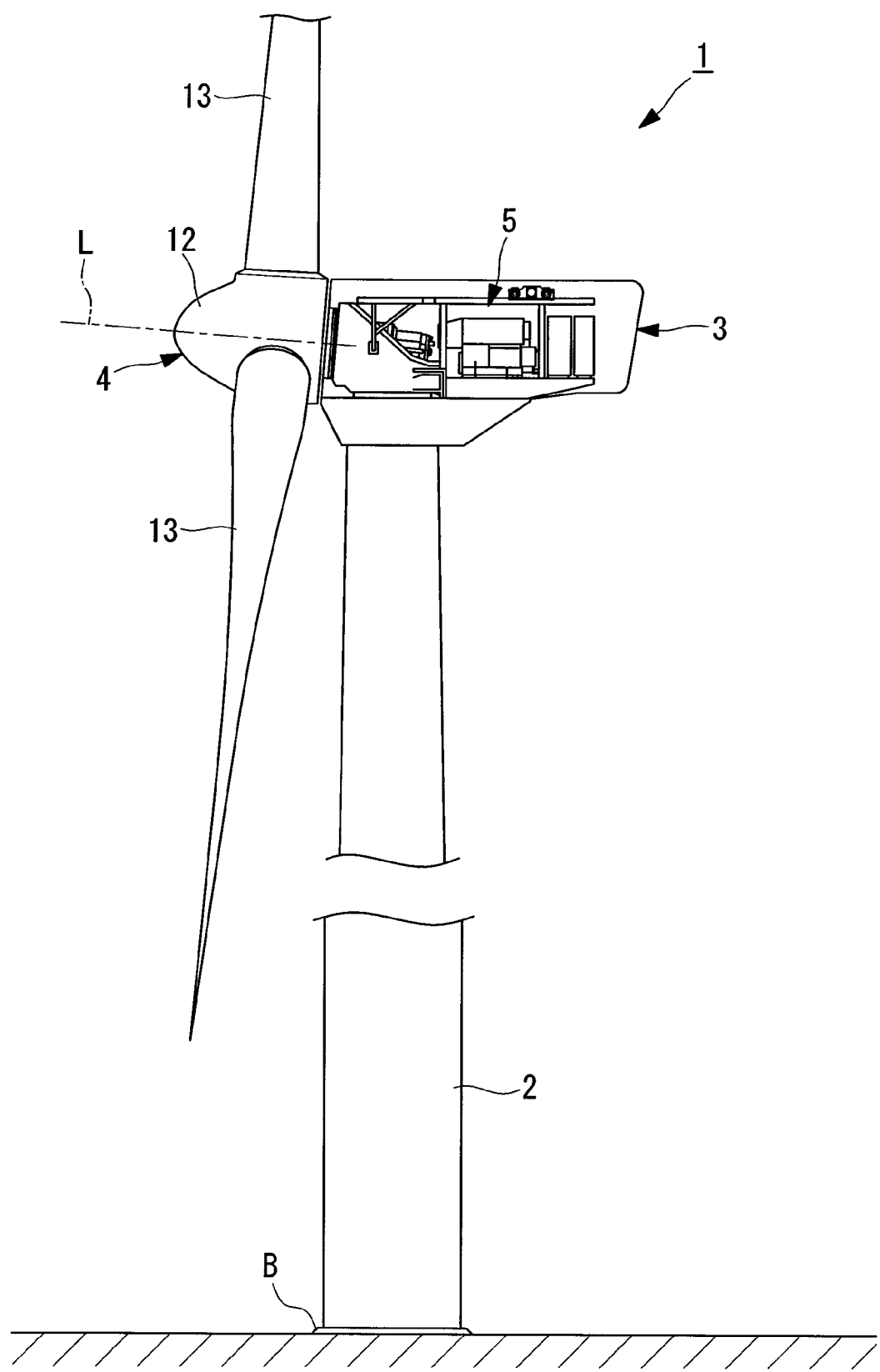
FIG. 1 is a schematic diagram showing, in outline, the structure of a wind turbine according to an embodiment of the present invention.

1: wind turbine generator
3: nacelle
4: rotor
11: rotor head
13: wind-turbine rotor blade
22: main hoisting portion (second hoisting portion)
23: auxiliary hoisting portion (first hoisting portion)
32: main wire (second wire)
33: auxiliary wire (first wire)
37: winder (wire-length adjusting portion)
36: large crane (heavy machine)
L: rotation axis
S1: assembly step
S2: wire attaching step
S3: hoisting step
S4: rotor raising step
S5: orientation adjusting step
S6: rotor attaching step

BEST MODE FOR CARRYING OUT THE INVENTION

Referring to FIGS. 1 to 8, a wind turbine generator 1 according to an embodiment of the present invention will be described.

FIG. 1 is a schematic diagram showing, in outline, the structure of a wind turbine according to this embodiment.

As shown in FIG. 1, the wind turbine generator 1 performs wind turbine generation. The wind turbine generator 1 includes a tower 2 installed upright on a foundation B, a nacelle 3 mounted on the top of the tower 2, a rotor 4 mounted to the nacelle 3 so as to be rotatable about a substantially horizontal axis, and a power generating unit 5 for generating power by rotation of the rotor 4.

As shown in FIG. 1, the tower 2 has a columnar structure extending upward (upward in FIG. 1) from the foundation B, and has a structure in which, for example, a plurality of units are connected in the vertical direction. The nacelle 3 is mounted on the top of the tower 2. When the tower 2 consists of a plurality of units, the nacelle 3 is mounted on the top unit.

As shown in FIG. 1, the nacelle 3 supports the rotor 4 so as to be rotatable and accommodates the power generating unit 5 for generating power by rotation of the rotor 4.

The nacelle 3 has a mounting shaft (not shown) to which the rotor 4 is attached. The mounting shaft is disposed such that its axis is inclined upward by a predetermined angle (tilt angle), for example, about 5°, with respect to the horizontal direction. To conform to this, an attaching surface, which is a surface of the nacelle 3 facing the rotor 4 and perpendicular to the axis of the mounting shaft, is also inclined by a predetermined angle with respect to the vertical plane.

Figure 2:
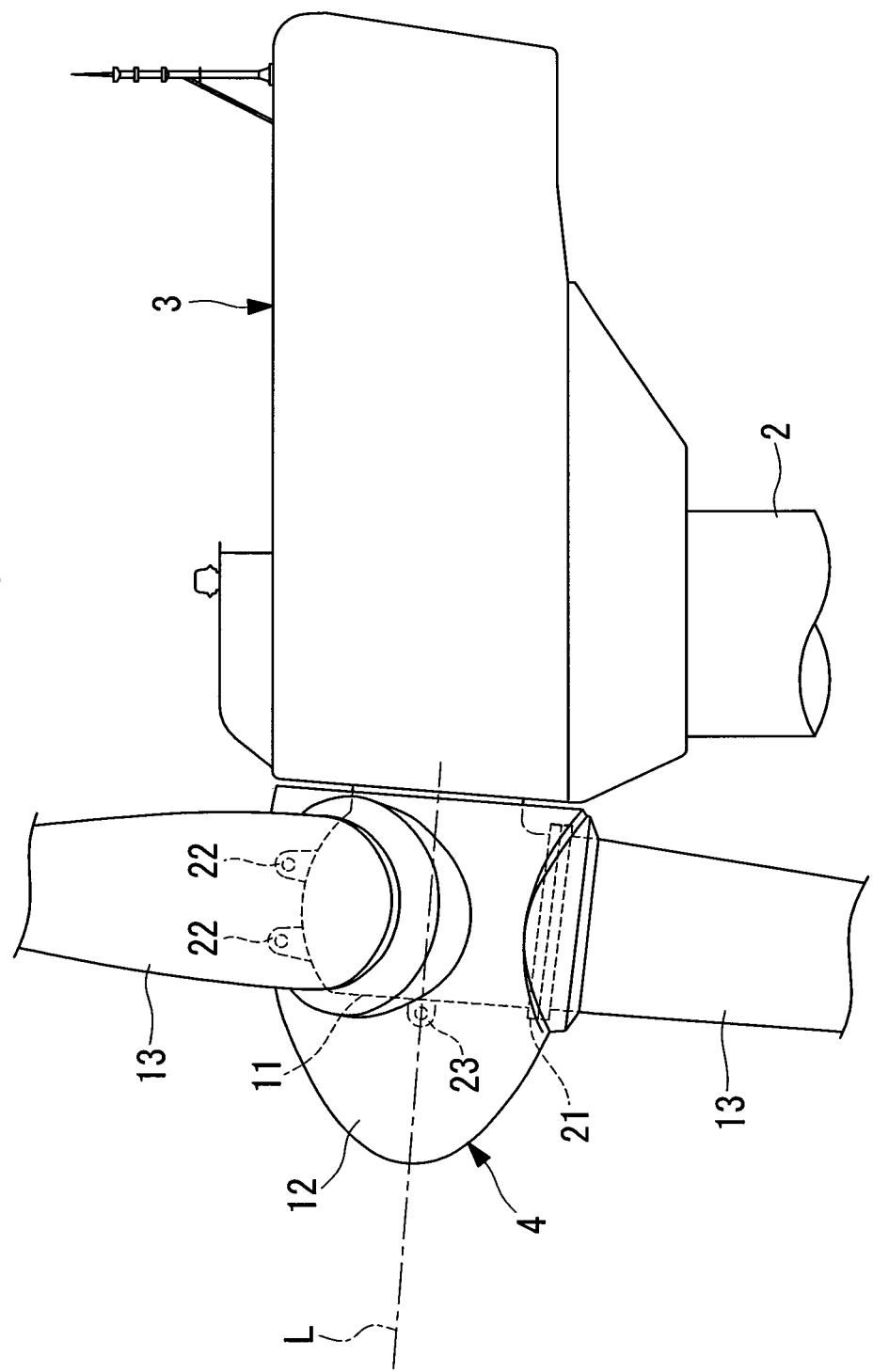
FIG. 2 is a partial enlarged view showing the structure of a rotor in FIG. 1.

FIG. 2 is a partial enlarged view showing the structure of the rotor in FIG. 1.

As shown in FIGS. 1 and 2, the rotor 4 includes a rotor head 11, a head capsule 12 for covering the rotor head 11, and a plurality of wind-turbine rotor blades 13 radially attached around a rotation axis L of the rotor head 11.

Although this embodiment will be described as applied to an example in which three wind-turbine rotor blades 13 are provided, the number of the wind-turbine rotor blades 13 is not limited to three, but may be two or more than three; it is not specifically limited.

The rotor head 11, to which the wind-turbine rotor blades 13 are attached, is rotated about the rotation axis L by the power generated by the wind-turbine rotor blades 13 which receive the wind.

The rotor head 11 has blade receiving portions 21 at equal intervals around the rotation axis L, to which the wind-turbine rotor blades 13 are to be attached, and has main hoisting portions (second hoisting portion) 22 at a position across the rotation axis L from one of the blade receiving portions 21.

Furthermore, the rotor head 11 has an auxiliary hoisting portion (first hoisting portion) 23 on the surface on the tip side (the left side in FIG. 2), on the rotation axis L.

The main hoisting portions 22 are portions to which a hoisting bracket 35 (described below) is to be attached so as to be engageable and disengageable. More specifically, the main hoisting portions 22 are each a pair of plate-like projections that support the hoisting bracket 35 disposed therebetween and are disposed on the tip side and the nacelle 3 side on the rotor head 11.

The auxiliary hoisting portion 23, to which the auxiliary wire 33 (described below) is to be attached, can be attached to and removed from the rotor head 11. More specifically, the auxiliary hoisting portion 23 is attached to the rotor head 11 when the rotor 4 is attached to the nacelle 3, and is removed from the rotor head 11 after the rotor 4 is attached to the nacelle 3.

The auxiliary hoisting portion 23 may be configured to be either attachable to/removable from the rotor head 11, as described above, or to be fixed to the rotor head 11; it is not specifically limited.

Figure 3:
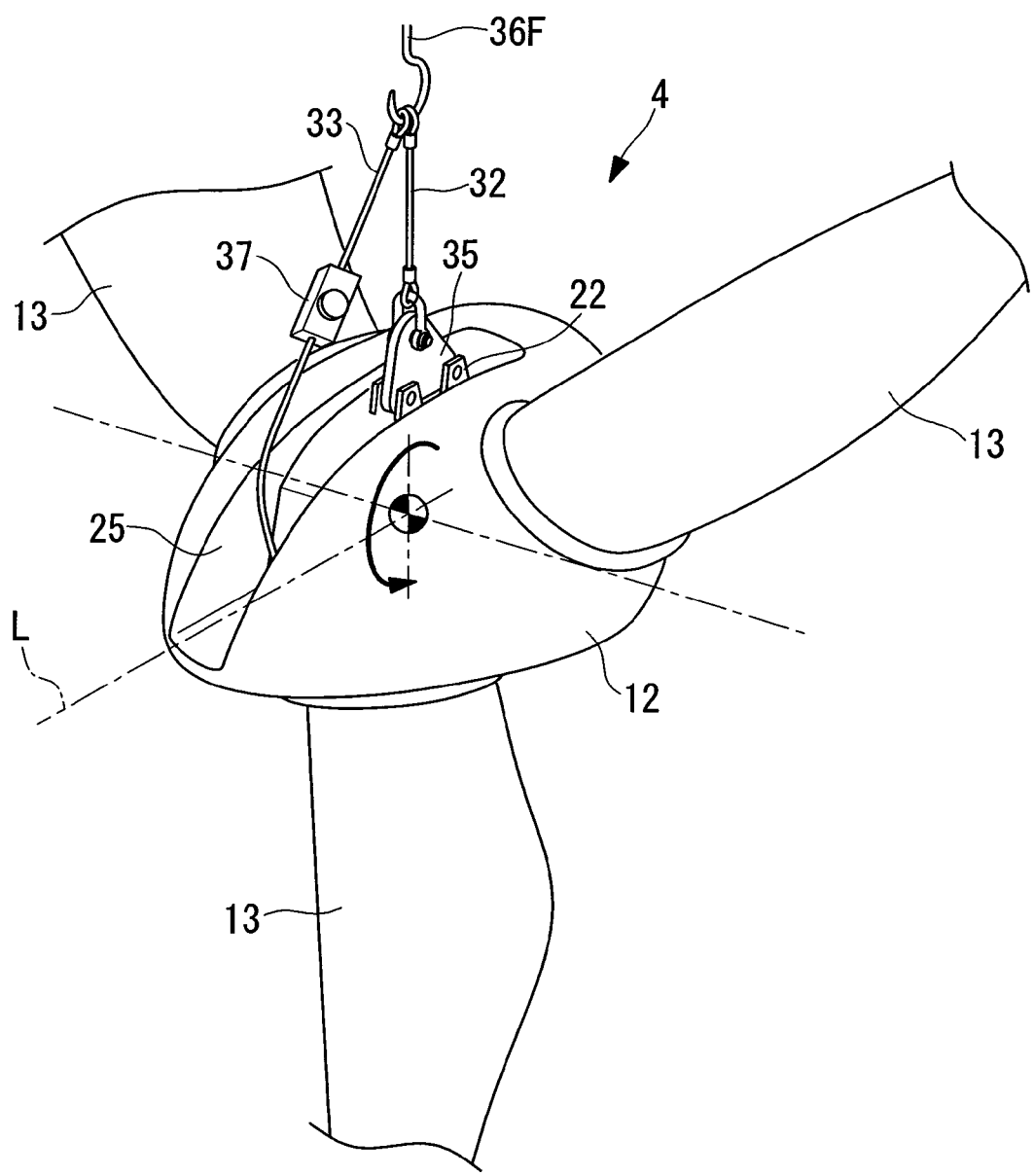
FIG. 3 is a perspective view showing the structure of a head capsule in FIG. 2.

FIG. 3 is a perspective view showing the structure of the head capsule in FIG. 2.

As shown in FIG. 3, the head capsule 12 has a hoisting opening 25 at a position facing the main hoisting portions 22. The hoisting opening 25 has a substantially rectangular shape, the front end of which extends to a position containing the rotation axis L of the rotor 4 and the rear end of which extends to a position where it does not interfere with the hoisting bracket 35.

When the rotor 4 is to be attached to the nacelle 3, the hoisting opening 25 in the head capsule 12 is opened, through which a main wire 32 and an auxiliary wire 33 for hoisting the rotor 4 are attached to the rotor 4. On the other hand, after the rotor 4 is attached to the nacelle 3, a cover (not shown) that becomes an integral part of the head capsule 12 and seals the hoisting opening 25 is disposed.

The cover may be formed separately from the head capsule 12 and seal the hoisting opening 25 from the inside of the head capsule 12 or may be attached to the head capsule 12 so as to be swingable via a hinge or the like (for example, it may be attached as double doors or a single door). It is not specifically limited.

An example of the power generating unit 5 is, for example, as shown in FIG. 1, one having a generator, to which the rotational driving force of the rotor 4 is transmitted so that power is generated, and a transformer for converting power generated by the generator into alternating-current power having a predetermined frequency (for example, alternating-current power of 50 Hz or 60 Hz).

An overview of a method for generating power using the wind turbine generator 1 having the above-described structure will be described next.

In the wind turbine generator 1, the force of the wind blowing in the rotation axis direction of the rotor 4 against the wind-turbine rotor blades 13 is converted into motive power for rotating the rotor 4 about the rotation axis L.

The rotation of the rotor 4 is transmitted to the power generating unit 5, where electric power suitable for an object to be supplied with electric power, for example, alternating-current power having a frequency of 50 Hz or 60 Hz, is generated.

At least during power generation, to allow the force of the wind to effectively act on the wind-turbine rotor blades, the nacelle 3 is appropriately rotated in the horizontal plane to make the rotor 4 face the upwind.

Attachment of the rotor 4 to the nacelle 3, which is a feature of the present invention, will be described next.

The method for installing the tower 2 and the method for attaching the nacelle 3 may be known methods; they are not specifically limited.

Figure 4:
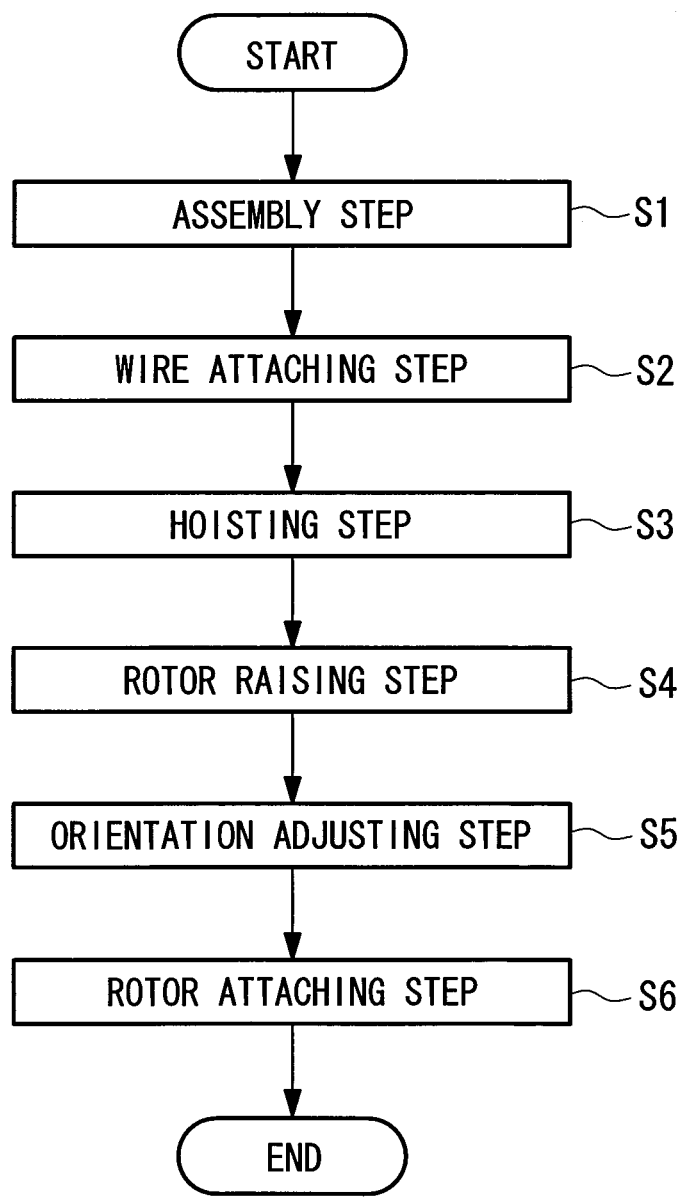
FIG. 4 is a flowchart for explaining attachment of the rotor to a nacelle.
Figure 5:
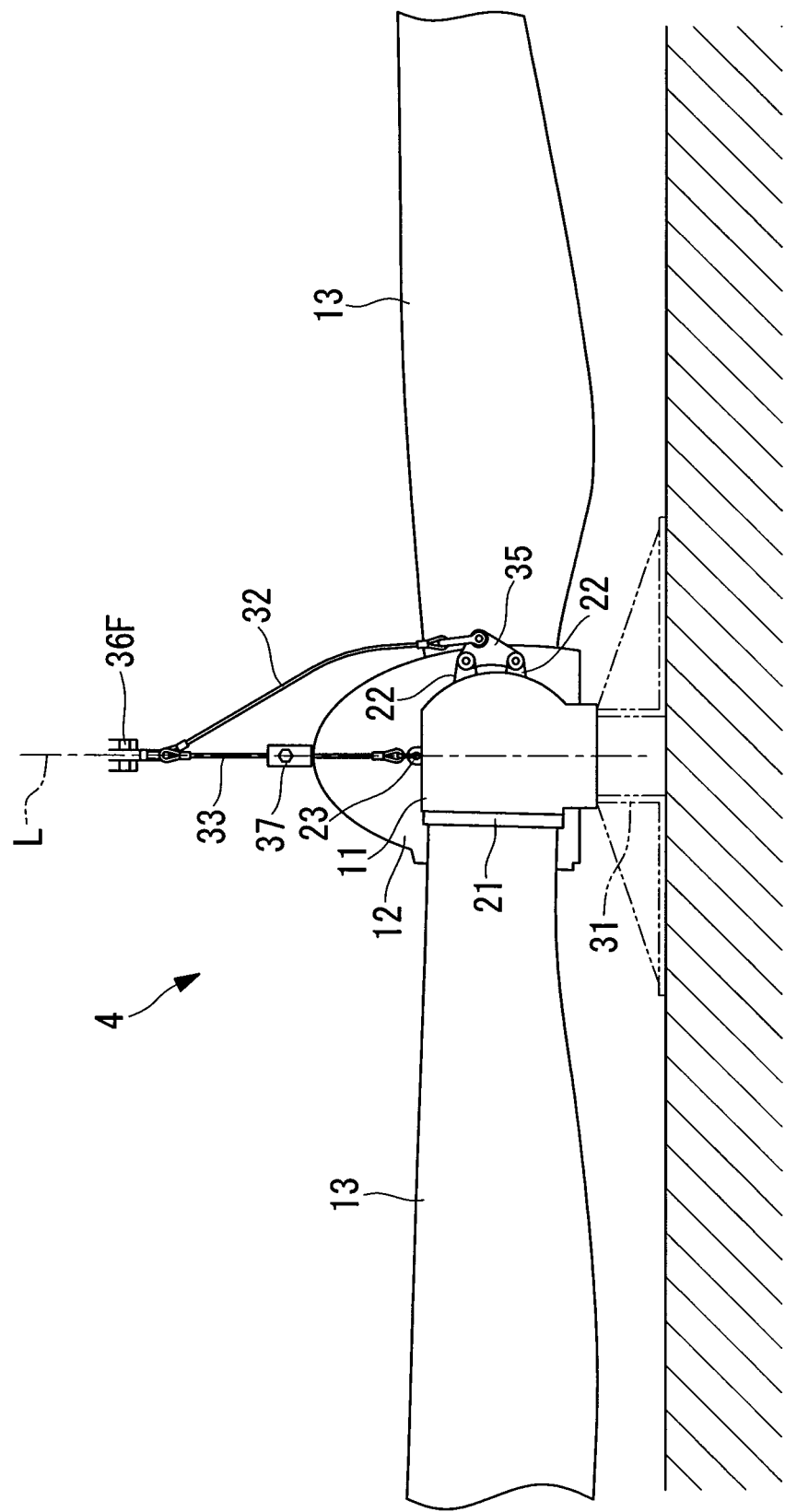
FIG. 5 is a diagram for explaining assembly of the rotor in FIG. 1.

FIG. 4 is a flowchart for explaining attachment of the rotor to the nacelle. FIG. 5 is a diagram for explaining assembly of the rotor in FIG. 1.

First, as shown in FIG. 4, the rotor 4 is assembled on the ground (assembly step S1).

More specifically, as shown in FIG. 5, the rotor head 11 and the head capsule 12 are disposed such that the front end is up and the rear end is down on a stand 31 placed on the ground. Then, the wind-turbine rotor blades 13 are attached to the blade receiving portions 21 of the rotor head 11. Thus, the rotor 4 is assembled.

Next, as shown in FIG. 4, the main wire (second wire) 32 and the auxiliary wire (first wire) 33 are attached to the rotor 4 (wire attaching step S2).

As shown in FIG. 5, the hoisting bracket 35 is attached to the main hoisting portions 22, and one end of the main wire 32 is attached to the hoisting bracket 35. On the other hand, the auxiliary hoisting portion 23 is attached to the rotor head 11, and one end of the auxiliary wire 33 is attached to the auxiliary hoisting portion 23.

At this time, the hoisting opening 25 in the head capsule 12 is opened.

The other ends of the main wire 32 and auxiliary wire 33 are attached to a hook 36F of a large crane for hoisting the rotor 4. A winder (wire-length adjusting portion) 37 for adjusting the length of the auxiliary wire 33 is provided between one end and the other end of the auxiliary wire 33.

Once the main wire 32 and the auxiliary wire 33 are attached to the rotor 4, the rotor 4 is hoisted by a large crane (heavy machine) 36 (refer to FIG. 8) (hoisting step S3).

When the rotor 4 is hoisted, the auxiliary wire 33 is wound up by the winder 37. Thus, the auxiliary wire 33 is taut, and the main wire 32 is slack. In other words, the rotor 4 is hoisted only by the auxiliary wire 33.

The auxiliary wire 33 extends from the auxiliary hoisting portion 23 in the rotation axis L direction of the rotor 4. Because the center of gravity of the rotor 4 is located on the rotation axis L, the rotor 4 hoisted by the auxiliary wire 33 maintains the orientation it had on the ground. That is, the rotor 4 is hoisted upward while maintaining an orientation in which the plane of rotation of the rotor 4 is substantially horizontal, i.e., an orientation in which the rotation axis L of the rotor 4 is substantially perpendicular.

When the rotor 4 is hoisted upward to a height where the wind-turbine rotor blade 13 will not interfere with the ground even if the rotor 4 is vertically raised, the rotor 4 is vertically raised as shown in FIG. 4 (rotor raising step S4).

Herein, the phrase "to raise vertically" means to change the orientation of the rotor 4 from an orientation in which the rotation axis L is substantially perpendicular to an orientation in which the rotation axis L is substantially horizontal. More specifically, it means to change the orientation such that the angle formed between the rotation axis L and the horizontal direction becomes a mounting angle substantially equal to the above-mentioned tilt angle. This orientation makes the plane of rotation of the rotor 4 and the attaching surface of the nacelle 3 substantially parallel.

Figure 6:
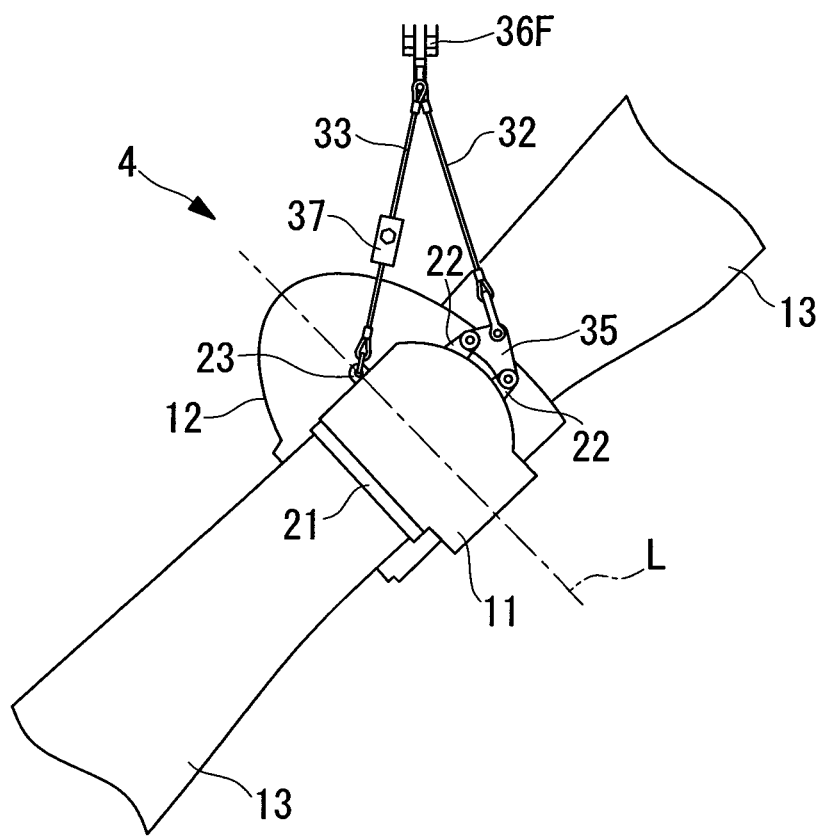
FIG. 6 is a schematic diagram showing a process of vertically raising the rotor.

FIG. 6 is a schematic diagram showing a process of vertically raising the rotor.

As shown in FIGS. 3 and 6, when the rotor 4 is hoisted upward, the auxiliary wire 33 is let out from the winder 37.

Thus, the whole length of the auxiliary wire 33 is extended. At this time, the winder 37 is remote-controlled.

Examples include, for instance, supplying the electric power from a power unit placed on the ground through a cable to the winder 37 to drive the winder 37 while controlling letting out and winding up of the auxiliary wire 33 from the ground; and wirelessly controlling the winder 37 which is driven by a battery or the like.

When the length of the auxiliary wire 33 increases, the main wire 32, having been slack, becomes gradually taut.

Because the auxiliary hoisting portion 23 of the rotor 4 is lowered downward, whereas the main hoisting portions 22 of the rotor 4 are not, the orientation of the rotor 4 is gradually raised. In other words, the angle formed between the rotation axis L and the horizontal direction gradually approaches the above-mentioned mounting angle.

Figure 7:
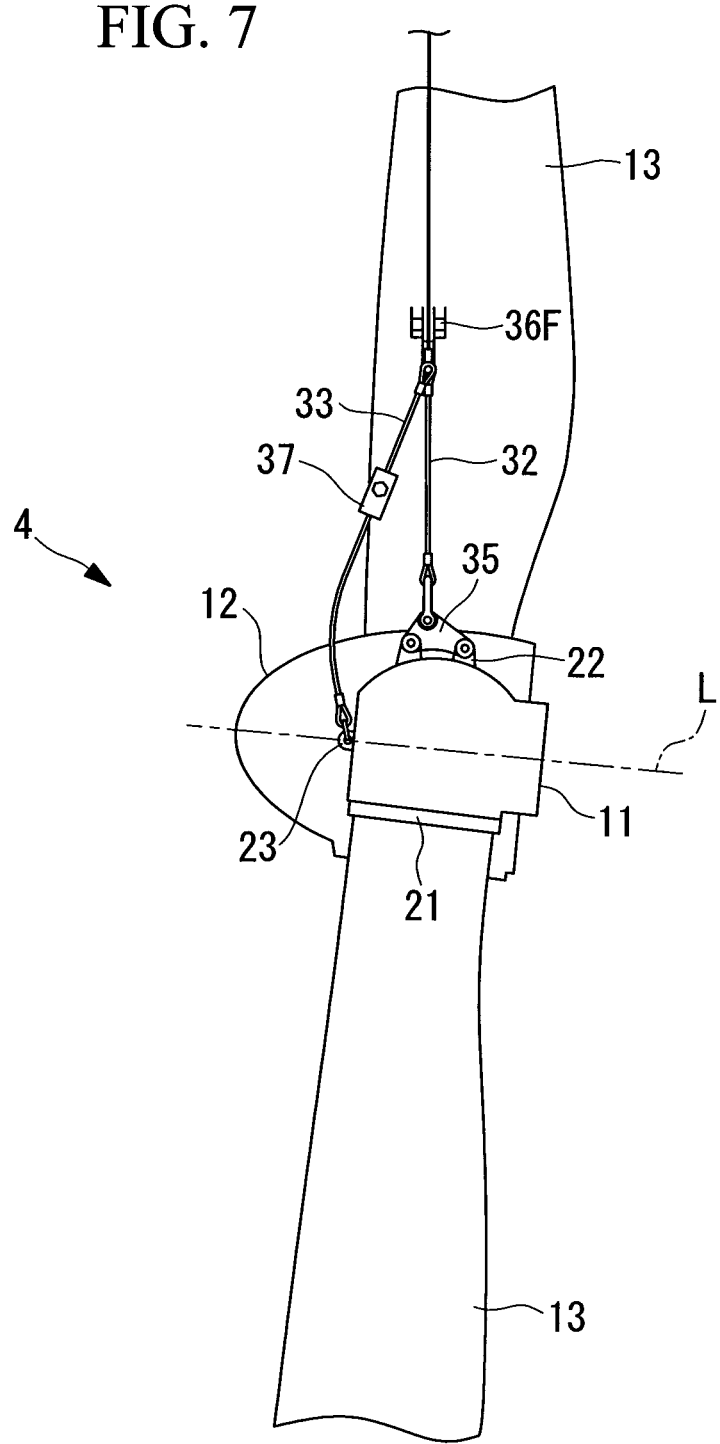
FIG. 7 is a schematic diagram showing the rotor after being vertically raised.

FIG. 7 is a schematic diagram showing the rotor after being vertically raised.

As shown in FIG. 7, when the winder 37 sufficiently lets out the auxiliary wire 33, the main wire 32 is taut and the auxiliary wire 33 is slack. That is, the rotor 4 is hoisted only by the main wire 32.

The rotor 4 and the hoisting bracket 35 are set such that the angle formed between the rotation axis L and the horizontal direction equals the above-mentioned mounting angle in this state.

However, in the case where the rotor 4 is in such an orientation that it cannot be attached to the nacelle 3 only by the main wire 32 due to individual differences of the rotor head 11, the wind-turbine rotor blades 13, the hoisting bracket 35, etc., the orientation of the rotor 4 is adjusted, as shown in FIG. 4 (orientation adjusting step S5).

When the angle formed between the rotation axis L of the rotor 4 and the horizontal direction is smaller than the mounting angle, the winder 37 winds the auxiliary wire 33 to tighten the auxiliary wire 33, inclining the rotation axis L. By adjusting the amount by which the auxiliary wire 33 is wound up, the angle formed between the rotation axis L and the horizontal direction is adjusted, making the rotation axis L and the mounting shaft of the nacelle 3 substantially parallel.

Figure 8:
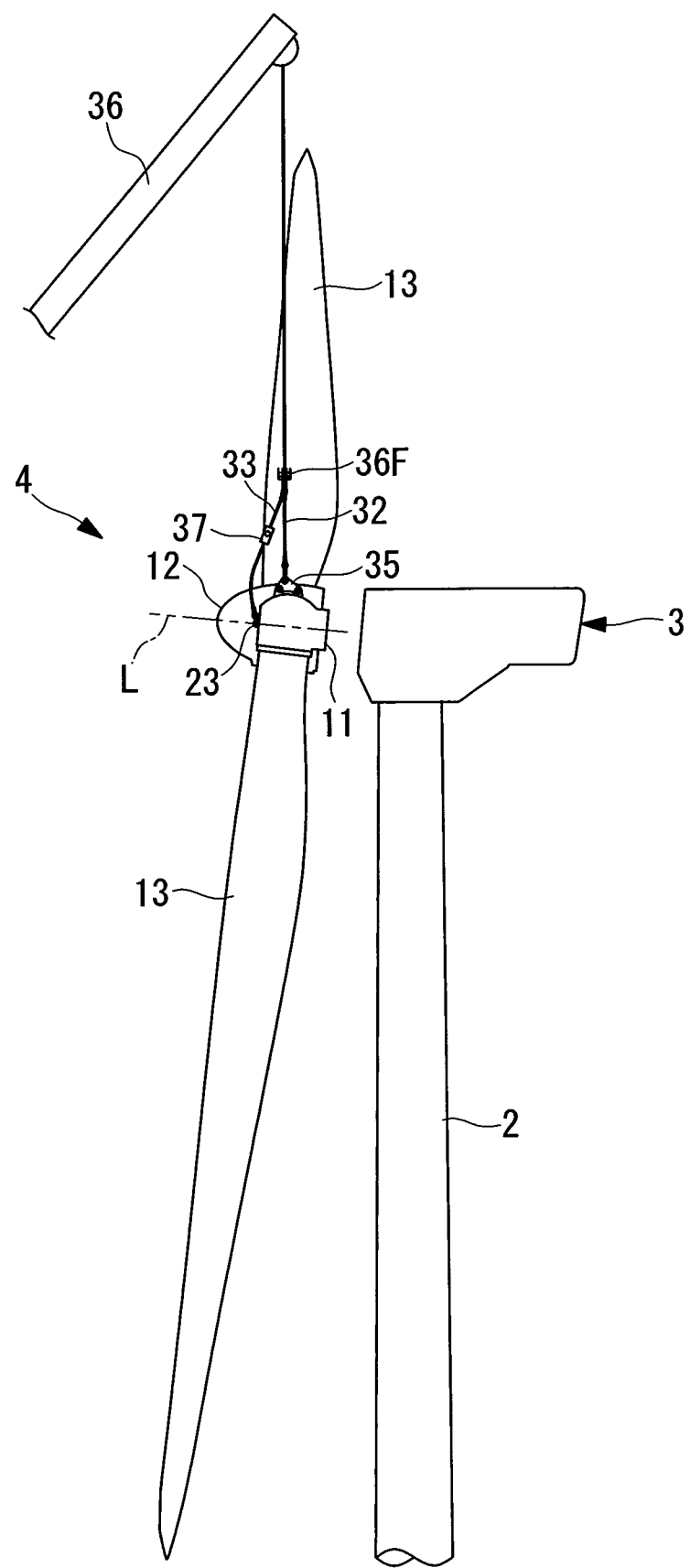
FIG. 8 is a schematic diagram for explaining attachment of the rotor to the nacelle.

FIG. 8 is a schematic diagram for explaining attachment of the rotor to the nacelle.

Once the angle formed between the rotation axis L and the horizontal direction becomes substantially equal to the mounting angle, the rotor 4 is attached to the nacelle 3 (rotor attaching step S6). That is, the rotor 4 is hoisted further upward by the large crane 36 and is attached to the attaching surface of the nacelle 3.

Once the rotor 4 is attached to the nacelle 3, the main wire 32, the auxiliary wire 33, the hoisting bracket 35, and the auxiliary hoisting portion 23 are removed from the rotor 4. Then, the cover is attached to the hoisting opening 25 in the head capsule 12.

Because the subsequent method of constructing the wind turbine generator 1 is the same as a known construction method, an explanation thereof will be omitted.

In the above-described structure, by hoisting the rotor 4 with the auxiliary wire 33 that is attached to the auxiliary hoisting portion 23 provided on the rotation axis L of the rotor 4, the rotor 4 is hoisted by the single large crane 36. At this time, the rotor 4 is, as it was on the ground, in the orientation in which the plane of rotation of the rotor 4 is substantially horizontal with respect to the ground, i.e., the orientation in which the rotation axis L is substantially perpendicular to the ground. Therefore, the wind-turbine rotor blades 13 are prevented from interfering with the ground.

Then, by extending the auxiliary wire 33 while hoisting with the single large crane 36, the rotor 4 is hoisted with the main wire 32 attached to the main hoisting portions 22 and the hoisting bracket 35. Because the main hoisting portions 22 and the hoisting bracket 35 are provided at a position away from the rotation axis L, the rotor 4 is brought into a vertically raised orientation, i.e., an orientation in which the rotation axis L is substantially horizontal.

In other words, the rotor 4 can be hoisted and the orientation of the rotor 4 can be vertically raised without holding the wind-turbine rotor blade 13. Furthermore, the rotor 4 assembled on the ground is hoisted, vertically raised, and then attached to the nacelle by the single large crane 36.

By adjusting the length of the auxiliary wire 33 with the winder 37, the inclination of the rotation axis L of the rotor 4 can be adjusted. This enables the inclination of the rotation axis L to be adjusted so as to conform to the inclination of the mounting shaft of the nacelle 3, making the attaching operation of the rotor 4 easy.

Although the above-described embodiment has been described as applied to an example in which the winder 37 for winding up and letting out the auxiliary wire 33 is used as means for adjusting the length of the auxiliary wire 33, it is not limited to the winder 37. The length of the auxiliary wire 33 may be adjusted by a jack device having a feeding mechanism; it is not specifically limited.

More specifically, examples include a Tirfor (registered trademark), which is a reciprocating winch, a Tirclimber, a center hole jack, and a hydraulic jack.

The invention claimed is:

1. A method of attaching a rotor of a wind turbine generator to a nacelle, the method comprising:
   an assembly step in which three wind-turbine rotor blades are radially attached to a rotor head around a rotation axis of the rotor to assemble the rotor on the ground;
   a cable attaching step in which
      a first end of a first cable is attached to a first hoisting portion provided on the rotation axis of the rotor on the rotor head to which the wind-turbine rotor blades have been attached,
      a first end of a second cable is attached to a second hoisting portion provided on the rotor head at a position away from the rotation axis of the rotor, and
      a second end of the first cable and a second end of the second cable are attached to a same single crane portion of a single crane which is separately provided from the wind turbine generator;
   a hoisting step in which the rotor is hoisted only with the first cable;
   a rotor raising step in which the first cable is extended so that the rotor is hoisted with the second cable; and
   a rotor attaching step in which the rotor hoisted with the second cable is attached to the nacelle.

2. The method according to claim 1, further comprising, before the rotor attaching step, an orientation adjusting step in which the orientation of the rotor is adjusted by adjusting a length of the first cable.

3. The method according to claim 2,
   wherein the orientation adjusting step comprises, changing the length of the first cable by adjusting a cable-length adjusting portion provided on the first cable.

4. The method according to claim 1, further comprising, changing a length of the first cable by adjusting a cable-length adjusting portion provided on the first cable.

5. The method according to claim 1, wherein, in the hoisting step, the rotation axis of the rotor is substantially vertical.

6. The method according to claim 1, wherein the first hoisting portion is provided on a tip side of the rotor head, said tip side being opposite to the nacelle.

7. The method according to claim 1, wherein, in the rotor raising step, the rotation axis of the rotor is substantially horizontal.

8. A method of constructing a wind turbine generator, the method comprising:
- an installation step in which a tower is installed upright on a foundation;
- a nacelle mounting step in which a nacelle is mounted on a top of the tower;
- an assembly step in which three wind-turbine rotor blades are radially attached to a rotor head around a rotation axis of a rotor to assemble the rotor on the ground;
- a cable attaching step in which
  - a first end of a first cable is attached to a first hoisting portion provided on the rotation axis of the rotor on the rotor head to which the wind-turbine rotor blades have been attached,
  - a first end of a second cable is attached to a second hoisting portion provided on the rotor head at a position away from the rotation axis of the rotor, and
  - a second end of the first cable and a second end of the second cable are attached to a same single crane portion of a single crane which is separately provided from the tower;
- a hoisting step in which the rotor is hoisted only with the first cable;
- a rotor raising step in which the first cable is extended so that the rotor is hoisted with the second cable; and
- a rotor attaching step in which the rotor hoisted with the second cable is attached to the nacelle.

9. The method according to claim 8, further comprising, before the rotor attaching step, an orientation adjusting step of adjusting an orientation of the rotor by changing a length of the first cable.

10. The method according to claim 9, wherein the orientation adjusting step comprises, changing the length of the first cable by adjusting a cable-length adjusting portion provided on the first cable.

11. The method according to claim 8, wherein, in the hoisting step, the rotation axis of the rotor is substantially vertical.

12. The method according to claim 8, wherein, the first hoisting portion is provided on a tip side of the rotor head, said tip side being opposite to the nacelle.

13. The method according to claim 8, wherein, in the rotor raising step, the rotation axis of the rotor is substantially horizontal.

* * * * *